United States Patent
Arinaga et al.

(10) Patent No.: US 8,133,031 B2
(45) Date of Patent: Mar. 13, 2012

(54) LIGHTNING PROTECTION DEVICE OF WINDMILL BLADE

(75) Inventors: Shinji Arinaga, Nagasaki (JP); Masaaki Shibata, Nagasaki (JP); Nobuyasu Nakamura, Nagasaki (JP); Takatoshi Matsushita, Nagasaki (JP); Kazuhisa Tsutsumi, Nagasaki (JP); Takao Kuroiwa, Nagasaki (JP); Toshiyuki Hirano, Nagasaki (JP); Kai Karikomi, Nagasaki (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 802 days.

(21) Appl. No.: 12/086,413

(22) PCT Filed: Dec. 19, 2006

(86) PCT No.: PCT/JP2006/325682
§ 371 (c)(1),
(2), (4) Date: Sep. 15, 2008

(87) PCT Pub. No.: WO2007/072961
PCT Pub. Date: Jun. 28, 2007

(65) Prior Publication Data
US 2009/0053062 A1    Feb. 26, 2009

(30) Foreign Application Priority Data
Dec. 21, 2005 (JP) .................. 2005-368667

(51) Int. Cl.
*B63H 11/16* (2006.01)
*B21D 53/78* (2006.01)
(52) U.S. Cl. .............. 416/229 R; 416/146 R; 29/889.71
(58) Field of Classification Search .............. 416/146 R, 416/230, 225, 247 R, 248, 229 R; 29/889.71; 361/212
See application file for complete search history.

(56) References Cited

U.S. PATENT DOCUMENTS

| | | | |
|---|---|---|---|
| 4,944,655 A * | 7/1990 | Merz | 416/61 |
| 6,457,943 B1 * | 10/2002 | Olsen et al. | 416/230 |
| 6,612,810 B1 * | 9/2003 | Olsen et al. | 416/95 |
| 6,979,179 B2 | 12/2005 | Moller Larsen | |
| 7,377,750 B1 * | 5/2008 | Costin et al. | 416/146 R |

(Continued)

FOREIGN PATENT DOCUMENTS

| | | |
|---|---|---|
| JP | H08-261135 | 10/1996 |
| JP | 2005-113735 | 4/2005 |
| WO | WO 96/07825 | 3/1996 |

(Continued)

*Primary Examiner* — Thomas L Dickey
*Assistant Examiner* — Nikolay Yushin
(74) *Attorney, Agent, or Firm* — Manabu Kanesaka; Kenneth M. Berner; Benjamin J. Hauptman

(57) ABSTRACT

The present invention proposes a lightning protection device of a windmill blade, comprising a tip receptor assembly having receptors which are mounted, in particular to, the tip end part of the blade where the blade profile becomes smaller, and having a simple structure so as to be readily assembled, and an intermediate receptor assembly having a receptor which is set at the outer surface of the blade so as to exhibit an effective countermeasure against increasing of the air pressure in the blade upon a lightning striking upon the blade, a lightening current being discharged to the ground from the receptors through connection equipment such as lead wires laid through the inside of the blade the windmill body and bypass brushes, characterized in that a base plate made of an electrically conductive material and connected thereto with the lead wires is embedded in the blade, and the receptors are secured and supported to the base plate, being exposed at the outer surface of the blade. Further, the present invention also proposes a method of assembling the lightning protection device.

10 Claims, 4 Drawing Sheets

U.S. PATENT DOCUMENTS

| | | | |
|---|---|---|---|
| 2002/0164251 A1* | 11/2002 | Sehgal et al. | 416/134 A |
| 2004/0253114 A1* | 12/2004 | Gunneskov et al. | 416/224 |
| 2006/0126252 A1* | 6/2006 | Mortensen | 361/118 |
| 2006/0280613 A1* | 12/2006 | Hansen | 416/230 |
| 2007/0253827 A1* | 11/2007 | Dahl et al. | 416/230 |

FOREIGN PATENT DOCUMENTS

| | | |
|---|---|---|
| WO | WO 02/48546 A1 | 6/2002 |
| WO | WO 2004/111686 | 12/2004 |
| WO | WO 2005/0026538 | 3/2005 |
| WO | WO 2005/031158 A2 | 4/2005 |

* cited by examiner

To the Ground

LIGHTNING PROTECTION DEVICE OF WINDMILL BLADE

TECHNICAL FIELD

The present invention relates to a lightning protection device of a windmill blade, comprising a lightning receptor attached to the outer surface of the blade, a lightning current being discharged from the receptor to the ground through connection equipment such as a conductor laid through the inside of the windmill blade and a windmill body portion or a bypass brush, and a method of assembling the lightning protection device.

BACKGROUND ART

As the measures for protecting a windmill turbine blade or an overall windmill device from a lightning striking upon the windmill blade, for example, a Patent Document 1 (PCT-WO2004/111686A1) or a Patent Document 2 (PCT-WO2005/026538A1) proposes a lightning protection device comprising a lightning receptor attached to the outer surface of a blade, from which a lightning current caused by a lightning striking to the receptor is led to the ground through a conductor extended through the inside of the blade, a rotor head, a main shaft, a tower and the like in the body part of the windmill device.

In the technology disclosed in Patent Document 1, lightning receptors are arranged at several positions at the outer surface of a windmill blade along the lengthwise direction of the blade from the tip end part thereof, and lightening currents from the receptors are discharged to the ground through leas wires led through the inside of the blade and the windmill body.

In the technology disclosed in Patent Document 2, lightning receptors are exposed at the outer surfaces of the belly side shell and the back side shell of the blade, as viewed in a predetermined section of the blade so as to allow a lightning to strike thereto, and the receptors are fixed respectively at the rear surface of the belly side shell and the back side shell by means of screws while lead wires from the receptors are connected to a down conductor.

However, although the technology disclosed Patent Document 1 concerns the configuration that lightening currents from the lightning receptors which are arranged at several positions along the lengthwise direction of the blade from the tip end thereof, are discharged to the ground through the lead wires led in the inside of the blade and the windmill body, and although the technology disclosed in Patent Document 2 concerns the configuration that the lightning receptors are exposed at the belly side shell and the back side shell of the blade so as to allow a lightning to strike thereto while the receptors are fixed respectively at the rear surfaces of the belly side shell and the back side shell by means of screws, both Patent Documents fail to disclose effective measures for assembling a receptor to the tip end part of the blade having a smaller airfoil profile, a countermeasure against a pressure increase induced in the inside of the blade upon striking of a lightning to the blade, and the like.

DISCLOSURE OF THE INVENTION

The present invention is devised in view of the above-mentioned problems inherent to the prior art, and accordingly, an object of the present invention is to provide a lightning protection device of a windmill blade, having a simple structure which allows easy assembling of a receptor adapted to be attached to the tip end part of the blade having a smaller airfoil profile, and which can have an effective countermeasure against a pressure increase induced in the inside of the blade upon striking of a lightning to the blade, and another object of the present invention is to provided a method of assembling the lightning protection device of a windmill blade.

To the end, according to the present invention, there is provided a lightning protection device of a windmill turbine blade, comprising a lightning receptor attached to the outer surface of the blade, from which a lightening current is discharged to the ground through connection equipment such as a lead wire led through the inside of the blade and a windmill body or a bypass brush, characterized by a receptor assembly having such a configuration that a base plate made of an electrically conductive material, to which the lead wires are connected, is embedded in the blade, and the receptor is fixed and supported to the base plate, being exposed at the outer surface of the blade.

In this invention, an adhesive is preferably filled in the internal space of the blade in the vicinity of the receptor assembly, including the periphery of the base plate. As to the adhesive, there may be preferably used a methacrylate group adhesive.

Further, according to the present invention, there is provided a method of assembling a lightning protection device of a windmill blade, which is configured as stated above, and in which a lightning receptor is set at the outer surface of the blade, and a lightening current is led to the ground through connection equipment such as lead wires or a bypass brush passing through the inside of the blade and a windmill body, characterized by the steps of inserting a base plate made of an electrically conductive material and connected thereto with the lead wires, in the inside of the blade, filling an adhesive between the base plate and the shell of the blade so as to fix the base plate in the blade, and forming a receptor insertion hole piercing through the shell of the blade and the adhesive, and inserting the receptor in the receptor insertion hole so as to fix the receptor to the base plate.

According to the present invention, since the lightning receptor is fixed and supported to the base plate made of an electrical conductive material and embedded in the blade so as to constitute a receptor assembly, and a ground wire is connected to the base plate, the structure thereof can be extremely simplified, and since the lightning receptor is fixed and supported to the base plate so as to have a unit structure, the assembling of the receptor to the blade can be also simplified.

Further, since the unit of the receptor assembly can be optionally set in a part where a lightning is possibly caused, such as a tip end part or an intermediate part of a blade, its handling can be facilitated.

Further, by filling an adhesive in the internal space of the blade in the vicinity of the receptor assembly including the periphery of the base plate, the air in the internal space can be displaced with the adhesive, and accordingly, it is possible to avoid increasing the pressure of the air in the internal space due to the expansion of the air therein upon a lightning striking upon the blade, thereby it is possible to prevent occurrence of breakage of the blade caused by the increase in the air pressure in the internal space.

In addition, since the belly side shell and the back side shell of the blade can be joined to each other through the intermediary of the adhesive, thereby it is possible to enhance the strength of the blade.

Further, the present invention may preferably has the following configurations:

(1) The above-mentioned receptor assembly is provided in the tip end part of the blade (claim 3). In this case, the receptor assembly is preferably located nearer the tip end of the blade, than a main beam which is embedded in the blade in the lengthwise direction of the latter (claim 4).

With this configuration in which the receptor assembly is provided in the tip end part of the blade where no main beam frame is present since no sustention of the strength is required, the receptor assembly can be easily embedded within the blade, thereby it is possible to simply mount the receptor assembly even in an existing blade;

(2) In the above-mentioned receptor assembly, the above-mentioned receptor is one of disc-like receptors which are arranged on both berry side and back side of the blade, one or more for each side, the receptors on the belly side of the blade being shifted from the receptors on the back side thereof at the outer surface of the blade, and which are fixed to the above-mentioned base plate (claim 5).

With this configuration, by arranging the receptor assemblies so as to shifted the receptor from one another on the outer surface of the blade, even in the part of the blade which is thin so as to have smaller dimensions between the belly side shell and the back side shell, such as the tip end part of the blade, the receptor assemblies can be readily set on both belly side and back side of the blade.

(3) The receptor assembly are provided in the tip end part of the blade, and an adhesive is filled in the internal space thereof in the vicinity of the receptor assembly including the outer periphery of the base plate while a foamed urethane resin is filled in the internal space, in the parts of the blade, other than the part which is filled therein with the adhesive (claim 6).

With this configuration in which the internal space of the blade is filled with the adhesive (in the tip end part) and the urethane resin over the entire length of the blade (other than the tip end part), it is possible to enhance the effect of preventing occurrence of expansion of air and an increase in the air pressure in the internal space of the blade upon a lightning striking upon the blade 1, and a breakage of the blade caused thereby.

Thus, according to the present invention, the receptor assembly is formed by fixing and supporting the lightning receptor to the base plate made of an electrically conductive material and embedded in the blade while the base plate is connected thereto with a ground lead wire, and accordingly, the configuration of the receptor assembly can become extremely simple. Further, since the lightning receptor is fixed and supported to the base plate so as to be formed into a unit body, the receptor assembly can be easily assembled to the blade 1. further, the receptor assembly can be set in any of optional parts of the blade, that is, the tip end part, the intermediate part and the like of the blase, where lightning would be possibly caused, thereby it is possible to satisfactorily facilitated the handling thereof.

Further, by filling the adhesive in the internal space of the blade in the vicinity of the receptor assembly including the periphery of the base plate, there can be avoid increasing the air pressure in the internal space of the blade, which is caused by an expansion of the air in the internal space upon a lightning striking upon the blade, thereby it is possible to prevent the blade from being broken being caused by an increase in the air pressure in the internal space of the blade.

BRIEF DESCRIPTION OF THE DRAWINGS

FIG. 1B is a sectional view along A-A in FIG. 1A;

BEST EMBODIMENT FOR IMPLEMENTING THE INVENTION

Detailed explanation will be hereinbelow made of an embodiment of the present invention shown in the accompanying drawings. It is noted that the dimensions, materials, shapes and relative arrangements of component parts described in this embodiment should not be intended to limit the scope of the present invention thereto, that is, these are mere of examples.

Figure 4:
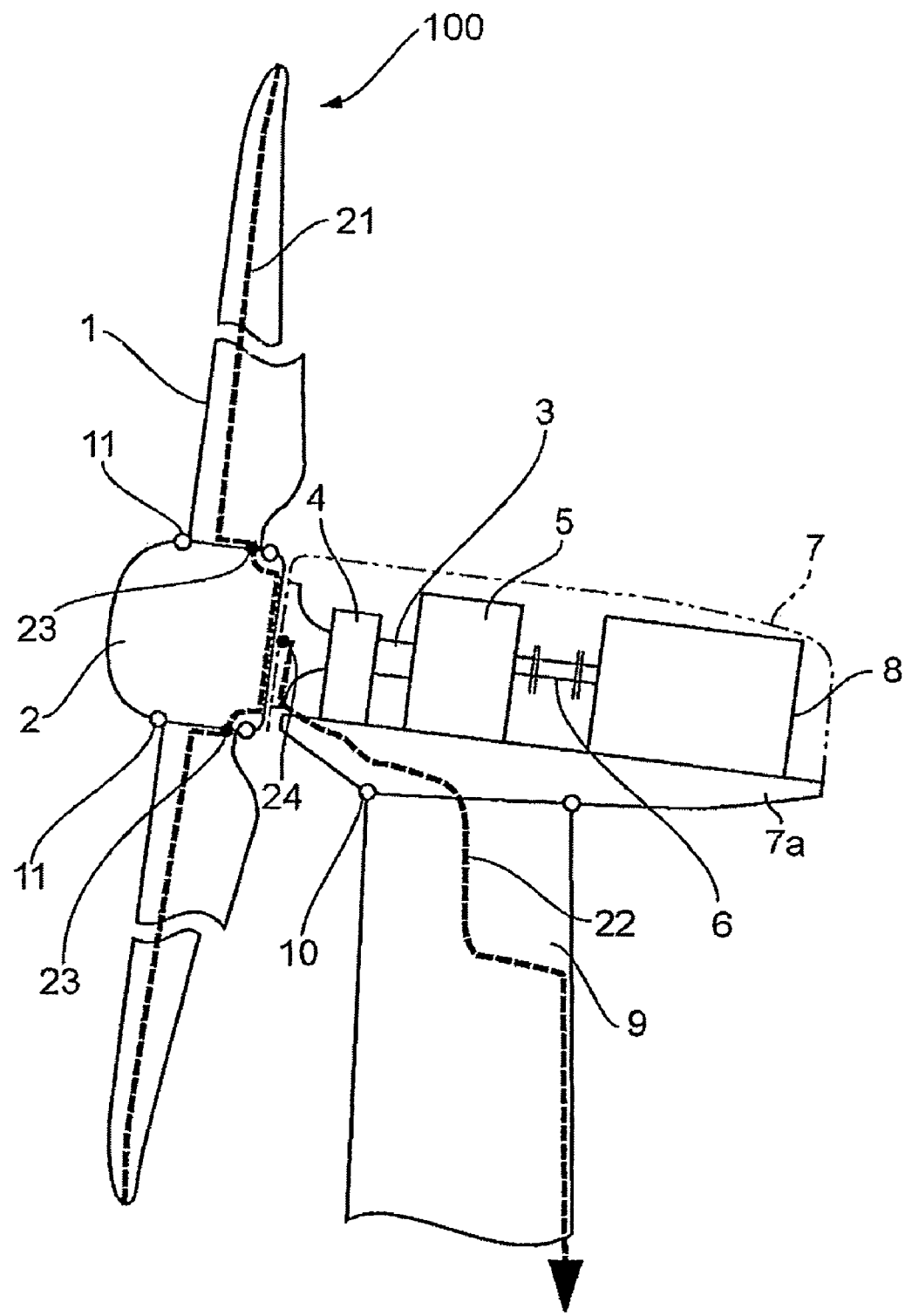
FIG. 4 is a schematic side view illustrating a windmill equipped with a lightning protection device according to the present invention.

Referring to FIG. 4 which is a schematic side view illustrating a windmill equipped with a lightning protection device according to the present invention, there are shown a rotor head 2, a plurality of blades 1 attached to the outer periphery of the rotor head 2, a main shaft 3 constituting an output shaft of the rotor head 2, a main bearing 4, a generator 8, a speed-increasing gear 5 for increasing the speed of the rotor head 2 up to a rated speed of the generator 8, a coupling 6 for coupling the speed-increasing gear 5 with the generator 8, a nacelle 7, a nacelle bed panel 7a for supporting the nacelle 7 and a tower 9 installed upright on the ground.

Further, there are shown a yaw pivot bearing 10 interposed between the tower 9 and the nacelle bed panel 7a, and blade pivot bearings 11 for supporting the blades 1 to the rotor head 2.

Moreover, there are shown a lightning chip receptor assembly 100 attached to the tip end part of each of the blades 1, a down conductor 21 incorporating lead wires led from the tip receptor assembly 100, which is connected to a bypass lead wire 22 by way of a bypass brush 23 for the blade pivot bearing and a bypass brush 24 for the main shaft bearing, and the bypass lead wire 22 being connected to the tower 9 through which it is grounded.

The present invention relates to a windmill lightning protection device of the windmill which is shown in FIG. 4, and a method for assembling the lightning protection device.

Figure 1B:
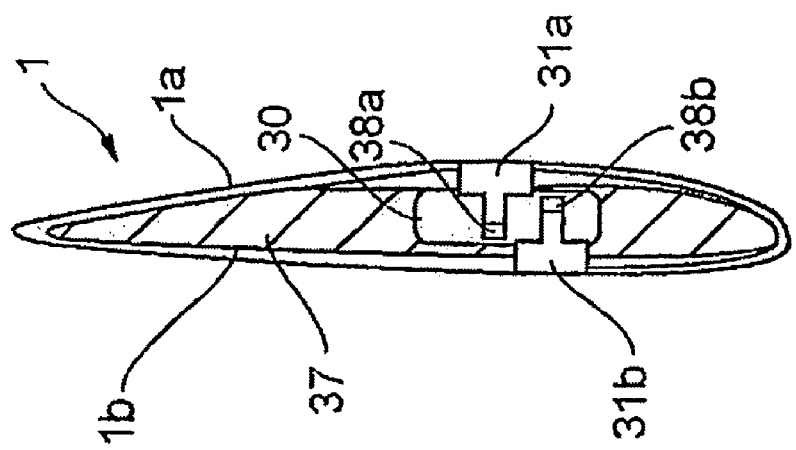
FIGS. 1A to 1B are views for illustrating a lightning protection device of a windmill blade, in an embodiment of the present invention, among which FIG. 1A (an enlarged view of a part Z in FIG. 2) is a partly enlarged sectional view illustrating the tip end part of the blade lightning protection device.
Figure 1A:
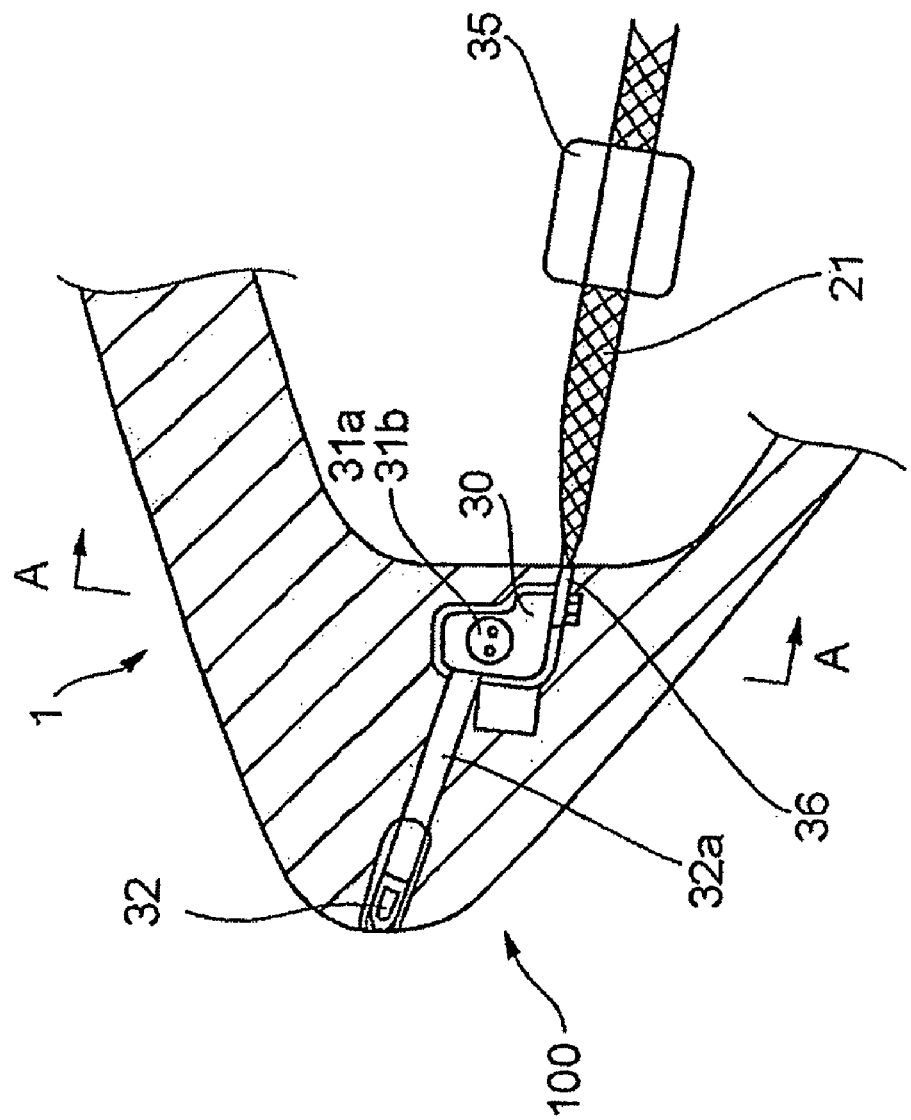
Figure 2:
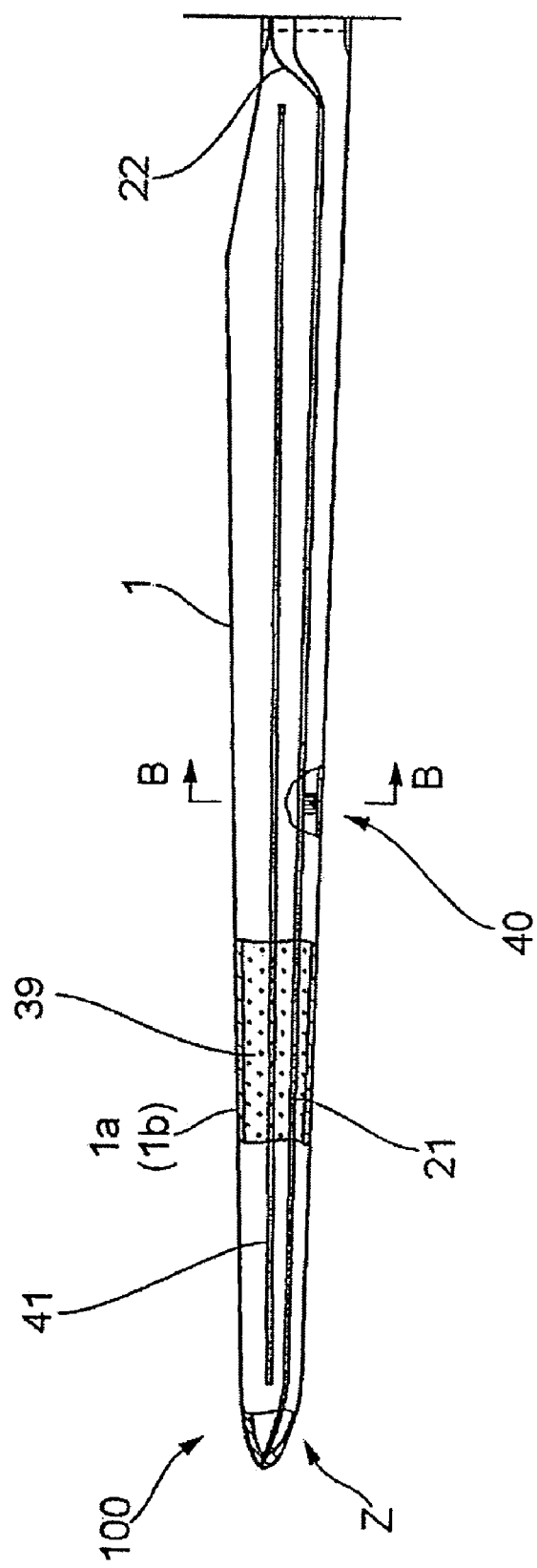
FIG. 2 is a side view illustrating the entire single blade in the above-mentioned embodiment.

FIG. 1A is a partially enlarged sectional view illustrating the tip end part of the windmill blade in the embodiment of the present invention (an enlarged view in a part Z in FIG. 2), and FIG. 1B is a sectional view along line A-A in FIG. 1A. FIG. 2 is a side view illustrating the blade in a single unit body, and FIG. 3 is a sectional view illustrating line B-B in FIG. 2.

Referring to FIG. 2, the tip receptor assembly 100 is mounted in the tip end part of the blade 1, and an intermediate receptor assembly 40 is mounted in the intermediate part of the blade 1. A reinforcing frame 41 is embedded in the blade 1, being extended in the lengthwise direction of the blade 1 from the root part of the blade 1. The blade 1 has a belly side shell 1b and a back side shell 1a.

Further, the above-mentioned down conductor 21 is connected to a base plate 30 (refer to FIG. 1, detailed explanation will be made later) which serves as an output end of each of the tip receptor assembly 100 and the intermediate receptor assembly 40, being laid toward the root of the blade within the latter, and is connected to a top panel (which is not shown) of the bottom part of the blade, which is made of an electrically conductive material, the bypass lead wire 22 being connected to the top panel.

Figure 3:
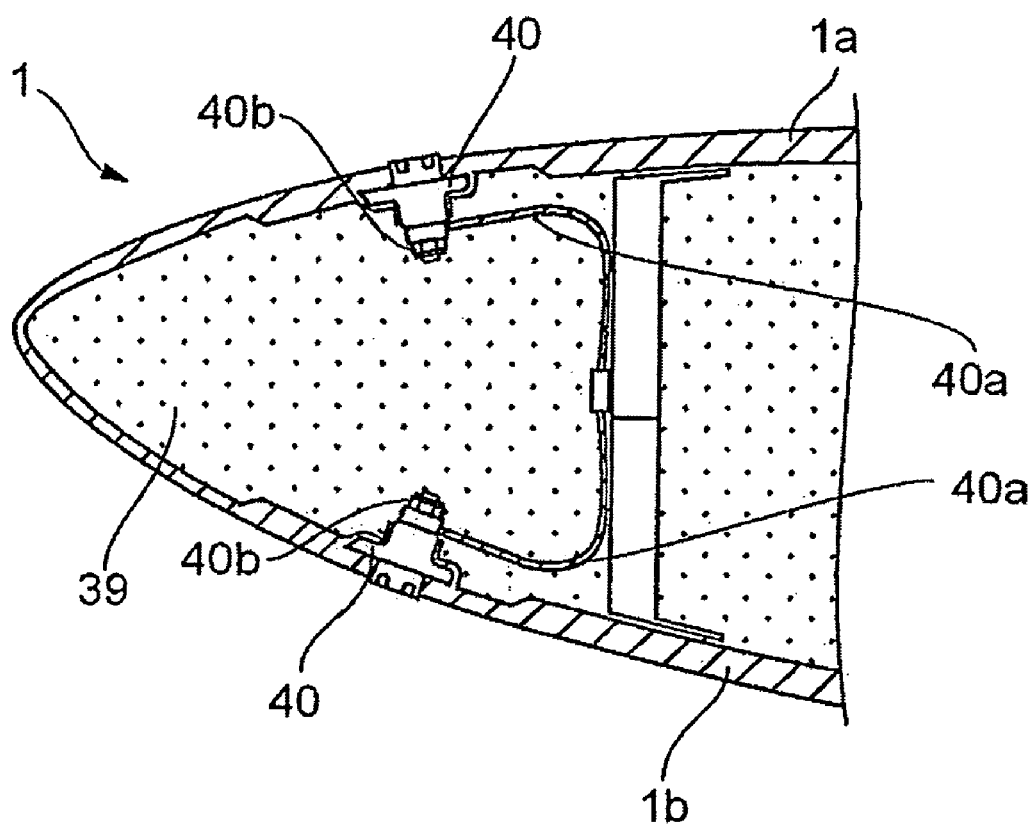
FIG. 3 is a sectional view along line B-B in FIG. 2.

Referring to FIG. 3 which shows an attachment configuration of the intermediate receptor assembly 40 in the blade 1, receptors in the intermediate receptor assembly 40 are made of stainless steel (or any other electrically conductive material), and are exposed to the outer surfaces of the belly side shell 1a and the back side shell 1b so as to allow receiving of a lightning, being fixed to the rear surfaces of the belly side shell 1b and the back side shell 1a by means of bolts. The intermediate receptors are connected to the down conductor 21 through the intermediary of lead wires 40a. There is shown a foamed urethane resin 39(which will be detailed later).

Referring to FIGS. 1A and 1B which show the tip receptor assembly 100 in detail, there are shown a rod receptor 32 set at the apex surface of the tip part of the blade 1 for a lightning striking upon the tip end of the blade, and disc receptors 31a, 31b attached to the opposite side surfaces of the tip end part, for lightning striking upon the opposite sides of the tip end part of the blade. The rod receptor 32 is preferably made of Cu—W alloy while the disc receptors 31a, 31b are preferably made of stainless steel although both may be made of any electrically conductive material.

The base plate 30 is made of an electrically conductive material, and is embedded in the inside of the tip end part of the blade 1. As shown in FIG. 1A, the rod receptor 32 is secured to the base plate 30 on the blade tip end part side 1 by means of a rod 32a, and as shown in FIG. 1B, the disc receptors 31a, 31b are screwed into the opposite side part of the base plate 30, respectively, (refer to thread parts 38a, 38b) so as to be fixed thereto. As shown in FIG. 1A, the base plate 30 is connected to the down conductor 21 through the intermediary of a connection terminal part 36. Further, the down conductor is held by an FRP fastener 35.

As shown in FIG. 1B, as to the receptor assembly in which the rod receptor 32 and both side disc receptors 31a, 31b are fixed to the base plate 30, an adhesive 37 is filled in the insides of the belly side shell 1b and the back side shell 1a around the base plate 30, and accordingly, the base plate 30 is positioned and fixed in the blade 1.

With the above-mentioned configuration, by filling the adhesive 37 in the internal space in the blade 1 in vicinity of the receptor assembly including the periphery of the base plate 30, the air in the internal space is displaced so as to be replaced with the adhesive 37, and accordingly, it is possible to avoid increasing the air pressure in the internal space due to expansion of the air in the internal space upon occurrence of a lightning striking upon the blade 1. Thereby it is possible to prevent occurrence of breakage of the blade caused by an increase in the air pressure in the internal space.

Further, since the belly side shell 1b and the back side shell 1a of the blade are bonded together through the intermediary of the adhesive 37, thereby it is possible to enhance the strength of the blade 1.

Further, as shown in FIG. 1B, the left and right disc receptors 31a, 31b in the receptor assembly, which are screwed into the opposite side parts of the base plate 30, are threadedly fixed to the latter, being shifted from each other in the chordwise direction of the blade 1.

With this arrangement in which the disc receptors 31a, 31b are shifted along the outer surface of the blade 1, the disc receptors 31a, 31b can be readily set on both belly side and the back side of the blade 1 even in the thin blade thickness part such as the blade tip part which has small dimensions between the belly side shell 1b and the back side shell 1a.

Further, as shown in FIG. 2, even in this embodiment, since the tip receptor assembly 100 is provided nearer the tip end of the blade 1, than the main beam frame 41, the tip receptor assembly 100 is provided in the tip end part of the blade 1 in which no main beam frame 41 is present since no sustention of strength is required. Thus, the base plate 30 of the tip receptor assembly 100 can be readily embedded in the blade 1, and accordingly, the tip receptor assembly 100 can readily be attached to an existing blade having no lightning protection device, additionally thereto.

With this configuration, as shown in FIG. 1A, the tip receptor assembly 100 is provided in the tip end part of the blade 1 while the adhesive 37 is filled in the internal space around the base plate 30 in the vicinity of the tip receptor assembly 100, and the foamed urethane resin 39 is filled in the internal space of the blade, except the parts where the adhesive 37 is filled as shown in FIGS. 2 and 3.

With this configuration, the adhesive 37 (in the tip end part) and the foamed urethane resin 39 (other than the tip end part) are filled in the internal space of the blade, over the entire length of the blade, it is possible to enhance the effects of preventing occurrence of expansion of the air in the internal space of the blade 1 upon a lightning striking upon the blade 1, occurrence of an increase in the pressure of the air, and breakage of the blade 1 caused thereby.

The breakage of the blade by a lightning is possibly caused not only by burning but also by an increase in the pressure of the air in the blade, which is expanded by being heated by electric discharge within the inside of the blade. Further, in this case, should a moisture penetrated into the blade be present due to dewing, the increase in the air pressure is accelerated due a phase change from the liquid phase into the gas phase thereof by heating, and accordingly, the blade is preferably formed in the way that the air (gas) and the moisture are displaced from the internal space of the blade as possible as it can. Further, the foamed urethane is used as a filler material, it is possible to prevent the weight of the blade from being excessively increased, and since the air which is inevitably present in the blade is split into a large number parts, the number of parts affected by occurrence of an electric discharge caused by a lightning, can be extremely small, and accordingly, even though the pressure is increased, the pressure does never overcome the strength limitations of the blade.

Upon assembling of the lightning protection device of a windmill blade, which is configured as stated above, the base plate 30 connected thereto with the down conductor 21 is inserted in the internal space of the blade 1, and the adhesive 37 is filled between the base plate 30 and the outer shells 1a and 1b and is then cured so as to secure the base plate 30 in the blade.

Then, the receptor insertion holes are formed piercing through the outer shells 1a, 1b and the adhesive 37, and the rod receptors 32 and the disc receptors 31a, 31b are inserted in the receptor insertion holes and are fixed to the base plate 30.

As stated above, in view of the above-mentioned embodiment, the rod receptors 32 and the disc receptors 31a, 31b for countermeasure against a lightning, are secured and supported to the base plate 30 made of an electrically conductive material and embedded in the blade 1 so as to constitute the tip receptor assembly (receptor assembly) 100, and the base plate 30 is connected thereto with the down conductor 21 incorporating the lead wires 21, and accordingly, the configuration of the lightning protection device is extremely simple. Further, since the rod receptor 32 and the disc receptors 31a, 31b are fixed and supported to the base plate 30 so as to be formed into a unit body, the assembling of the lightning protection device to the blade 1 can be facilitated.

Further, the unit of the receptor assembly (receptor assembly) 100 can be optionally set in the parts such as the tip end part and the intermediate part upon which a lightning is possibly caused, the handling thereof can become satisfactory.

Industrial Applicability

According to the present invention, the receptors adapted to be mounted in the tip end part of the blade where the profile of the blade becomes small in particular can be readily assembled, and further, there can be provided the lightning protection device of a windmill blade, which can exhibit an effective countermeasure against an increase in the pressure in the blade caused by a lightning striking upon the blade, and the method of assembling the lightning protection device.

The invention claimed is:

1. A lightning protection device of a windmill blade comprising:
   a lightning receptor set at an outer surface of the blade;
   a connection equipment including lead wires laid through an inside of the blade and a windmill body or bypass brushes for conducting a lightning current from the receptor through the connection equipment and discharging the lightning current into the ground;
   a base plate made of an electrically conductive material embedded in an internal space of a tip end part of the blade; and
   an adhesive filled in the internal space of the tip end part of the blade for embedding the base plate therein;
   wherein the receptor is fixed to the base plate piercing through side shells of the blade and the adhesive such that a part of the receptor is exposed at the outer surface of the blade,
   the lead wires are connected to the base plate via a connection terminal part, and
   the internal space of the blade filled with the adhesive is an inside space between a belly side shell and a back side shell of the tip end part of the blade in which a main beam frame for reinforcement is not present, the main beam frame being embedded in the blade to extend in a lengthwise direction of the blade from a root part of the blade, and air in the inside space of the blade is removed by the adhesive in the inside space.

2. A lightning protection device of a windmill blade as set forth in claim 1, further comprising at least one disc receptor on each of the belly side and the back side of the blade,
   wherein the receptors are fixed to the base plate, and are positionally shifted from each other on both belly side and the back side at the outer surface of the blade.

3. A lightning protection device of a windmill blade as set forth in claim 1, wherein a foamed urethane resin is filled in the internal space of the tip end part of the blade except parts the adhesive is filled such that the main beam frame and the lead wires are embedded therein.

4. A lightning protection device of a windmill blade as set forth in claim 1, wherein the lead wires are held by an FRP fastener.

5. A lightning protection device of a windmill blade as set forth in claim 1, wherein the receptor is inserted in a receptor insertion hole piercing through the outer shell and the adhesive of the blade, and is fixed to the base plate.

6. A lightning protection device of a windmill blade as set forth in claim 5, wherein the lead wires are held by an FRP fastener.

7. A windmill blade comprising the lightning protection device of claim 1.

8. A windmill comprising the windmill blade of claim 7.

9. A method of assembling a lightning protection device of a windmill blade, in which a lightning receptor is set at an outer surface of the blade, a lightening current is discharged to the ground through connection equipment including lead wires laid through the blade and a windmill body or a bypass brush, the method comprising the steps of:
   inserting a base plate made of an electrically conductive material and connected thereto with the lead wires in the inside of the blade;
   filling an adhesive in an internal space of the blade between a belly side shell and a back side shell of a tip end part of the blade in which a main beam frame for reinforcement is not present, the main beam frame being embedded in the blade to extend in a lengthwise direction of the blade from a root part of the blade, such that the base plate is embedded in the internal space;
   fixing the base plate in the inside of the blade filled in the internal space of the blade;
   forming a receptor insertion hole piercing through the outer shell and the adhesive;
   inserting the receptor in the receptor insertion hole and fixing the receptor to the base plate; and
   connecting the lead wires to the base plate via a connection terminal part.

10. A method of assembling a lightning protection device of a windmill blade set forth in claim 9, further comprising a step of filling a foamed urethane resin in the internal space of the blade except for parts in which the adhesive is filled so that the lead wires are embedded therein.

* * * * *